Patented Nov. 23, 1948

2,454,737

UNITED STATES PATENT OFFICE 2,454,737

COPOLYMERS OF HYDROCARBON DIENES AND ACRYLATES OF ALPHA-HYDROXY-METHYLETHANO-9,10-DIHYDROANTHRACENE

Earl W. Gluesenkamp and Alfred B. Craig, Dayton, Ohio, assignors to Monsanto Chemical Company, St. Louis, Mo., a corporation of Delaware No Drawing. Application December 4, 1947, Serial No. 789,775

4 Claims. (Cl. 260—84.5)

This invention relates to new synthetic rubber compositions having very desirable tensile strength and elongation. More particularly the invention relates to copolymers of hydrocarbon dienes and the acrylic acid esters of alpha-hydroxymethylethano-9,10-dihydroanthracene.

Synthetic rubbers made from hydrocarbon dienes and the acrylic esters are well known. Of these known acrylic copolymer rubbers, the copolymers of esters of the lower molecular weight alkyl alcohols are known to posssess superior properties to the copolymers of the alkyl esters of higher molecular weight. It is therefore, the fundamental purpose of this invention to provide new synthetic rubbers made from high molecular weight alcohols which have unusually high tensile strengths and resiliencies. A further purpose of this invention is to provide a new class of synthetic rubbers having properties superior to conventional synthetic rubbers of the GR–S type.

In accordance with this invention it has been found that hydrocarbon dienes, particularly those having the structural formula:

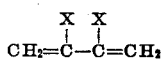

wherein X is a radical of the group consisting of methyl and hydrogen, for example isoprene, butadiene and 2,3-dimethyl butadiene, may be copolymerized with esters having the structural formula:

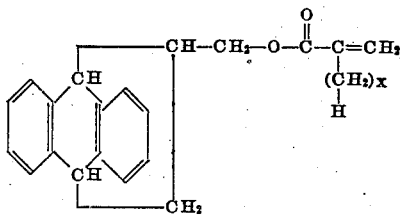

wherein X is a small whole number from 0 to 1 inclusive, to form synthetic rubbers having very unusual properties. It has been found that copolymers of 40 to 90 percent of the diene and from 10 to 60 percent of one of the comonomers are exceptional synthetic rubbers.

The polymerizations are effected in aqueous emulsions in the presence of an oxygen yielding catalyst, such as sodium perborate, hydrogen peroxide, sodium persulfate and other peroxy compounds or salts of peroxy acids having the molecular grouping (—O—O—), from 0.005 to 1.0 percent by weight being used. The aqueous emulsions are usually stabilized by the presence of a small amount, for example from 1 to 5 percent by weight, of a substance having both hydrophobic and hydrophilic radicals, such as rosin soap, sulfonated hydrocarbons, water soluble salts of sulfuric acid esters of long chain alkyl alcohols, triethanolamine and other amino soaps, the water soluble salts of high molecular weight fatty acids including the mixtures obtained by saponification of animal and vegetable fats, and other similar compounds.

The polymerizations are conducted by charging the mixed monomers, water, peroxy catalyst, and emulsifying agent into a suitable reactor which is provided with a means for agitating the reaction mass. The agitation may be accomplished by tumbling the reactor, by stirring the contents with a suitable rotary stirring mechanism, or by any other means which promotes the intimate contact between monomer and the various reagents charged to the vessel. During the reaction of the vessel and its contents are maintained at a temperature between 30 and 80° C., for the purpose of inducing a rapid polymerization. Since the polymerization reactions evolves heat, care should be taken to avoid excessive temperatures and reaction rates such that the heat of polymerization cannot be removed from the reaction vessel. The temperature of polymerization should be so controlled that a uniform rate of polymerization is achieved throughout the reaction. When the polymerization is complete, or substantially complete, the emulsion is precipitated by the addition of water soluble salts, acids or alcohols, or any other substance which counteracts the emulsifying agent and permits the separation of aqueous liquor from the solid particles of rubber by filtration. The copolymers may then be pressed into suitable sized cakes for storage or further processing. The new rubber is compounded with the usual vulcanizing agents, for example antioxidants, accelerators and pigments and milled with conventional machinery, for example roll mills and Banbury mixers.

The new rubber is a good general purpose rubber but is especially suitable in applications requiring high tensile strength and elongation.

Further details of the preparation and compounding of the new rubber are set forth with respect to the following example.

Example

A glass reaction vessel provided with a reflux condenser adapted to separate water was charged with 97 grams of alpha-(hydroxymethyl)-9,10-ethano-9,10-dihydroanthracene, 49 grams of methacrylic acid, 1 gram of hydroquinone, 400 cc.

benzene, 1 gram benzene sulfonic acid and 1 cc. of concentrated sulfuric acid. The mixture was refluxed for 24 hours at which time 7.2 cc. of water had been separated from the condensate. The benzene solution was washed with distilled water, with dilute potassium carbonate and again with distilled water. The benzene was evaporated and the concentrated liquid was poured into hexane and filtered. The hexane solution was cooled and the crystallized esters thereafter separated. The ester was then recrystallized from dilute ethanol solution, filtered and dried in vacuum. The recovered solid represented a 76 percent yield of alpha-(methacryloxy methyl)-9,10-ethano-9,10-dihydroanthracene.

A stainless steel bomb having a capacity of 1.6 liters was charged with 75 grams of the ester prepared in accordance with the description of the preceding paragraph and in addition the following materials:

| | |
|---|---|
| Butadiene _____ grams__ | 225 |
| Distilled water _____ cc__ | 750 |
| Soap (principally sodium stearate) grams__ | 15 |
| Potassium persulfate _____ do__ | 0.9 |
| Dodecyl mercaptan _____ do__ | 1.5 |

The bomb was provided with a means for continuously determining the pressure in the interior. It was sealed and tumbled in a circulating hot air bath maintained at 50° C. throughout the reaction. At the beginning of the reaction the interior pressure of the bomb was 50 pounds per square inch and the reaction was continued until the pressure was reduced to less than 25 pounds per square inch. The reaction mass was cooled and 0.1 percent of hydroquinone added for the purpose of inhibiting further polymerization.

An antioxidant emulsion was prepared by dissolving 4.5 grams of a reaction product of acetone and para-aminobiphenyl in 25 ml. of benzene. This mixture was then added with stirring to a solution of 0.75 gram of soap in 75 cc. of water. The resulting emulsion was added to the latex which was then coagulated by adding an equal volume of a solution comprised of the following:

| | |
|---|---|
| Sodium chloride _____ grams__ | 189 |
| Distilled water _____ ml__ | 1,330 |
| Glacial acetic acid _____ do__ | 1.64 |
| Aluminum sulfate _____ grams__ | 1.64 |
| Isopropyl alcohol _____ ml__ | 300 |

The resulting precipitate was washed with distilled water and dried in a circulating hot air oven.

The copolymer prepared in accordance with the description in the preceding paragraph was compounded using as a control a copolymer of 75 percent by weight of butadiene and 25 percent of styrene. The following formulation was used:

| | Parts by weight |
|---|---|
| Copolymer _____ | 100.0 |
| Black (Kosmobile 77) _____ | 40.0 |
| Zinc oxide _____ | 3.0 |
| Stearic acid _____ | 1.0 |
| Reaction product of acetone and p-amino biphenyl _____ | 1.0 |
| Sulfur _____ | 2.0 |
| N-cyclohexyl-2-benzothiazyl sulfenamide __ | 1.2 |

The compositions were thoroughly mixed using a cold laboratory roll mill and the rubbers were sheeted and cut into standard samples for physical tests. The samples were cured by heating at 142° C. for 60 and 90 minute periods. The following table demonstrates the superiority of the new rubber composition by a comparison of the tensile strength and elongation of the new copolymers and a GR-S rubber prepared by an analogous method.

| Monomer | Minutes Cure | Tensile Strength, lbs. per sq. in. | Elongation, Percent |
|---|---|---|---|
| New Copolymer | 60 | 2,580 | 470 |
|  | 90 | 2,700 | 470 |
| Butadiene—75, Styrene—25 | 60 | 1,810 | 350 |
|  | 90 | 2,140 | 360 |

Although this invention has been described with respect to specific embodiments, it is not intended that the scope shall be limited by the details thereof, except to the extent incorporated in the following claims.

We claim:

1. A synthetic rubber composition which comprises a copolymer of 40 to 90 percent of a hydrocarbon diene having the structural formula:

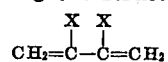

wherein X is a radical of the group consisting of hydrogen and methyl, and from 10 to 60 percent of the compound having the structural formula:

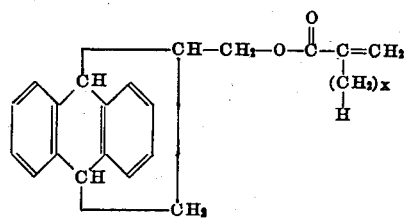

wherein X is a small whole number from 0 to 1 inclusive.

2. A synthetic rubber composition which comprises a copolymer of 40 to 90 percent butadiene and from 10 to 60 percent of a compound of the structural formula:

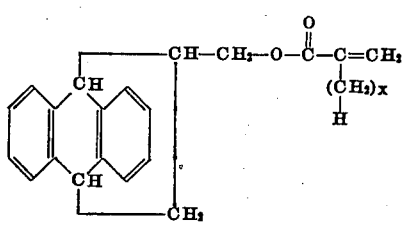

wherein X is a small whole number from 0 to 1 inclusive.

3. A synthetic rubber composition which comprises a copolymer of 40 to 90 percent butadiene and from 10 to 60 percent of (alpha-methacryloxymethyl) - 9,10 - ethano - 9,10 - dihydroanthracene.

4. A synthetic rubber composition which comprises a copolymer of 40 to 90 percent butadiene and from 10 to 60 percent of (alpha-acryloxymethyl)-9,10-ethano-9,10-dihydroanthracene.

EARL W. GLUESENKAMP.
ALFRED B. CRAIG.

No references cited.